US012792630B2

(12) United States Patent
Leu

(10) Patent No.: US 12,792,630 B2
(45) Date of Patent: Nov. 10, 2026

(54) DYNAMIC SHARDING METHOD FOR DISTRIBUTED DATA STORES

(71) Applicant: PayPal, Inc., San Jose, CA (US)

(72) Inventor: Eric Leu, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 30 days.

(21) Appl. No.: 18/596,407

(22) Filed: Mar. 5, 2024

(65) Prior Publication Data

US 2025/0284709 A1 Sep. 11, 2025

(51) Int. Cl.
*G06F 16/27* (2019.01)

(52) U.S. Cl.
CPC .................................. *G06F 16/278* (2019.01)

(58) Field of Classification Search
None
See application file for complete search history.

(56) References Cited

U.S. PATENT DOCUMENTS 10,776,396 B2 9/2020 D'Halluin et al.
10,866,868 B2 12/2020 Horowitz
11,615,115 B2 3/2023 Horowitz et al.
2014/0122510 A1* 5/2014 Namkoong ............. G06F 16/27 707/755
2015/0186187 A1* 7/2015 Weisberg .............. G06F 9/5083 707/747
2017/0366624 A1* 12/2017 Tsang .................... G06F 16/278
2018/0060037 A1* 3/2018 Johnson .................... G06F 7/08
2019/0171537 A1 6/2019 Wang et al.
2022/0188365 A1* 6/2022 Zhang ................ G06Q 10/0631
2022/0318074 A1 10/2022 Kompaniets et al.
2023/0169093 A1* 6/2023 Whitaker .............. G06F 16/278 707/803
2024/0045602 A1* 2/2024 Joshi ..................... G06F 3/0619

OTHER PUBLICATIONS

Leu, Eric, "Fast Consistent Hashing in Constant Time", published Dec. 28, 2023, 11 pages. (Year: 2023).*
"Consistent Hashing Algorithm", blog post by NK, Feb. 22, 2023, 37 pages, available at: https://highscalability.com/consistent-hashing-algorithm/ (Year: 2023).*
International Search Report and Written Opinion in PCT App. No. PCT/US2025/015458 mailed Apr. 22, 2025, 10 pages.

* cited by examiner

*Primary Examiner* — Scott A. Waldron
(74) *Attorney, Agent, or Firm* — Kowert, Hood, Munyon, Rankin & Goetzel, P.C.; Scott W. Pape; Dean M. Munyon

(57) ABSTRACT

Disclosed methods and systems include maintaining, by a computer system, a database stored across a first number of nodes. This maintaining may include dividing records into a particular number of shards that are distributed among the first number of nodes. In response to a change to a second number of nodes, the computer system may determine a number of shards per node based on the second number of nodes. The computer system may select a subset of the particular number of shards to distribute across the second number of nodes, and move the subset of shards to one or more of the second number of nodes.

20 Claims, 8 Drawing Sheets

*Shard distribution table 501*

| j | Number of nodes (n) | | | | No. of shards (k) |
|---|---|---|---|---|---|
| 0 | 1 | | | | 15 |
| 1 | 2, | 3 | | | 30 |
| 2 | 4, | 5, | 6 | | 60 |
| 3 | 8, | 10, | 12, | 15 | 120 |
| 4 | 16, | 20, | 24, | 30 | 240 |
| 5 | 32, | 40, | 48, | 60 | 480 |
| ... | ... | | | | ... |
| j | 2^j, | 5*2^(j-2), | 3*2^(j-1), | 15*2^(j-3) | 15*2^j |

*Shard ID table 550*

| Pre-split | Post-split | |
|---|---|---|
| 0 | 0, | 30 |
| 1 | 1, | 31 |
| 2 | 2, | 32 |
| 3 | 3, | 33 |
| 4 | 4, | 34 |
| 5 | 5, | 35 |
| ... | ... | |
| 29 | 29, | 59 |

*Shard distribution table 501*

| j | Number of nodes (n) | | | | No. of shards (k) |
|---|---|---|---|---|---|
| 0 | 1 | | | | 15 |
| 1 | 2, | 3 | | | 30 |
| 2 | 4, | 5, | 6 | | 60 |
| 3 | 8, | 10, | 12, | 15 | 120 |
| 4 | 16, | 20, | 24, | 30 | 240 |
| 5 | 32, | 40, | 48, | 60 | 480 |
| ... | ... | | | | ... |
| j | 2^j, | 5*2^(j-2), | 3*2^(j-1), | 15*2^(j-3) | 15*2^j |

*Shard ID table 550*

| Pre-split | Post-split | |
|---|---|---|
| 0 | 0, | 30 |
| 1 | 1, | 31 |
| 2 | 2, | 32 |
| 3 | 3, | 33 |
| 4 | 4, | 34 |
| 5 | 5, | 35 |
| ... | ... | |
| 29 | 29, | 59 |

*FIG. 5*

DYNAMIC SHARDING METHOD FOR DISTRIBUTED DATA STORES

BACKGROUND

Technical Field

This disclosure relates generally to computer-enabled data management, and more particularly to techniques for dynamically managing sharded data stores.

Description of the Related Art

Sharding (also referred to as horizontal partitioning) is a technique to scale-out and scale-in a distributed data store across multiple storage nodes. Records to be included in the distributed data store are divided into subsets (referred to herein as "shards") that are mapped, and then distributed across the multiple storage nodes according to the map. Each storage node may have a local data store for storing multiple shards with multiple records per shard. Using scale-out and scale-in operations, the number of nodes may be increased or decreased, respectively, based on current storage needs and/or equipment availability. To rebalance the storage loads from an original set of nodes to a subsequent set of nodes, some stored records may be moved to an added node in a scale-out operation or moved out of a departing node in a scale-in operation. Record redistribution may be a long running operation that moves a large amount of data among various nodes.

BRIEF DESCRIPTION OF THE DRAWINGS

FIG. 5 shows two tables associated with managing a sharded database.

DETAILED DESCRIPTION

Figure 1:
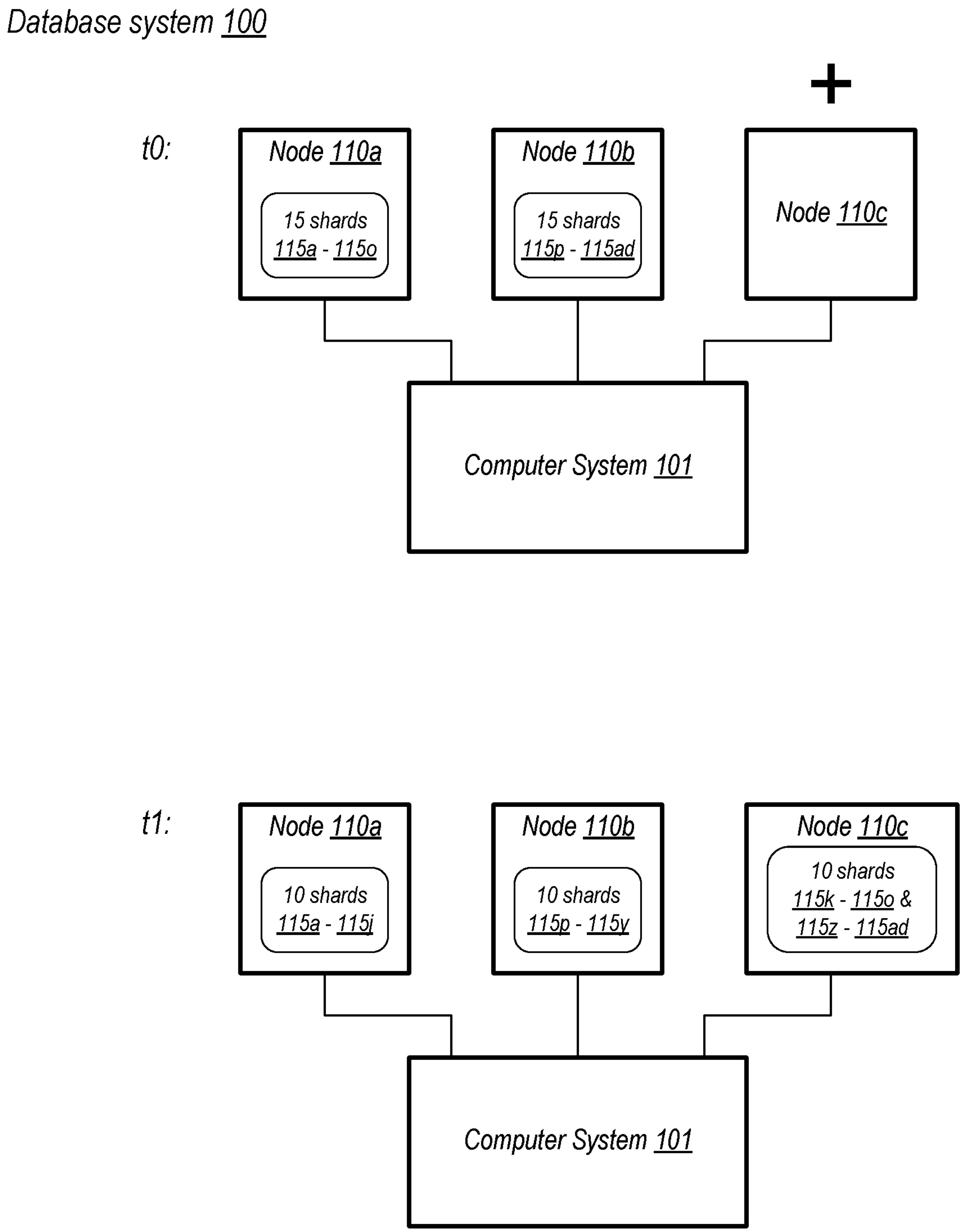
FIG. 1 is a block diagram illustrating, at two points in time, an embodiment of a database system that may be used to maintain a shared database.

As disclosed above, sharding may be used to scale-out and scale-in a distributed data store across multiple storage nodes. A common sharding method may map shards to ones of a plurality of nodes based on an identification value of the shard, e.g., a shard ID. Shard IDs may be determined based on a hash key associated with a given record, wherein the number of hash keys is larger than the number of shard IDs. Accordingly, a map identifying a node ID for a given shard ID may be smaller than a map identifying a node ID for a given hash key. This map may link multiple shards to a single node. In scale-out and scale-in database structures, the number of nodes may change over time. Accordingly, some mappings from shard ID to node ID will change with a change in the number of nodes.

It is typically desirable to maintain a load balance such that a number of shards per node is kept consistent, thereby reducing a chance that one node is accessed more than another, which could cause a bottleneck at the more highly used node. If a number of nodes increases from ten to twelve, then two-twelfths of the stored shards may be moved from respective ones of the ten original nodes to the two added nodes in a rebalancing operation. Several issues may arise with the common sharding method. One issue, load imbalance may occur if the total number of shards is not divisible by the new number of nodes. For example, if there are 100 shards mapped across the ten nodes, then there is a load balance of 10 shards per node. If the number of nodes increases to twelve, at best, the 100 shards may be mapped to the twelve nodes such that four nodes store nine shards each and eight nodes store eight shards each. If each shard includes a similar number of records, then each of the four nodes with nine shards will be accessed 12.5% more frequently than each of the eight nodes with eight shards. In a database with a high volume of users, this load imbalance may cause significant traffic congestion at the four nodes.

Another issue with common sharding methods is long durations for data redistribution operations and generation of associated hotspots during these redistributions. Revisiting the example of scaling from ten nodes to twelve nodes, to rebalance the loads across the twelve nodes, approximately 17% (two-twelfths) of records need to move from the ten original source nodes to the two added target nodes. In common sharding methods, load balancing is achieved by moving individual records to shards on an added node. Accordingly, records are read from shards in the source nodes and inserted to shards on target nodes. The target nodes become hotspots of activity due to a large number of records being inserted into the data stores of the target nodes. In a database with a large number of nodes, more target nodes are likely to become hotspots, which may utilize complicated rate limiting on incoming traffic to the database in order to mitigate the congestion, thereby resulting in longer delays for database users.

A further issue with common sharding methods is scalability of the number of nodes. Common sharding techniques may set a fixed number of shards to be distributed across the plurality of storage nodes. As a number of nodes increases, the less likely it is for the fixed number of shards to be evenly divisible by the increased number of nodes, thereby reducing an ability to balance loads evenly across the nodes.

The present disclosure recognizes that a novel sharding technique may be implemented that supports scaling in and out of storage nodes while mitigating the issues disclosed above. Such a technique may utilize a map that links a plurality of shards to one of a set of nodes using an algorithm that allows changes of the number of shards within a prescribed set of conditions. A number of nodes may be scaled in or out using a particular number of nodes, where the particular number is selected from a subset of whole numbers.

Disclosed embodiments include a technique in which a computer system may maintain a database stored across a first number of nodes. This maintaining may include dividing records into a particular number of shards that are distributed among the first number of nodes. In response to a change to a second number of nodes, the computer system may determine a number of shards per node based on the second number of nodes. The computer system may then select a subset of the particular number of shards to distribute across the second number of nodes and move the subset of shards to one or more of the second number of nodes. In some embodiments, moving ones of the subset of shards includes moving the shards in their entirety.

A block diagram of an embodiment of a database system that may be used to implement the disclosed techniques is illustrated in FIG. 1. As illustrated, elements of database system 100 are depicted at two different points in time. Database system 100, as shown, includes computer system 101 and a plurality of nodes 110*a*-110*c* (collectively 110). Computer system 101, in various embodiments, may be implemented as a single computer (e.g., a desktop computer, laptop computer, server computer), or a plurality of computers located in a single location or distributed across multiple locations. In some embodiments, computer system 101 may be implemented using a virtual machine hosted by one or more server computer systems. Similarly, a given one of nodes 110 may, in various embodiments, may be implemented as an individual mass-storage device, a plurality of storage devices operating as a single storage device, one or more storage devices managed by a virtual computer, or other suitable type of storage system. Computer system 101, in various embodiments, may be coupled directly to nodes 110, linked to nodes 110 via a wide area network (e.g., the internet), or a combination thereof.

Prior to time t0, database system 100 includes a first number of nodes (e.g., two nodes 110*a* and 110*b*) that are used to store a plurality of records. Nodes 110*a* and 110*b* may be coupled to a respective one or more data stores and configured to manage access to a database including a particular number of shards 115*a*-115*ad* (collectively 115) that are stored across nodes 110*a* and 110*b*. As illustrated, computer system 101 may be configured to maintain database system 100 across nodes 110, including dividing records across shards 115 that are distributed among nodes 110. Computer system 101 may include a non-transitory, computer-readable memory storing instructions, and a processor configured to execute these instructions to cause the system to perform operations described herein.

At time t0, node 110*c* is added to nodes 110*a* and 110*b*. As shown, computer system 101 is configured to, after a change from the first number of nodes (two nodes 110*a* and 110*b*) to a second number of nodes (e.g., three nodes 110*a*, 110*b*, and 110*c*), determine a distribution plan to distribute shards 115 across the three nodes 110*a*-110*c*. In various embodiments, node 110*c* may be new equipment added to database system 100 or may be existing equipment that may have been taken off-line or otherwise disabled from database system 100. Node 110*c* may be reactivated to provide additional storage capacity for database system 100. In some embodiments, for example, computer system 101 may be configured to add or remove a number of active nodes in database system 100 as demand for storage capacity increases or decreases, respectively.

To determine the distribution plan, computer system 101 may be configured to, in response to determining that the particular number of shards 115 is evenly divisible by the second number of nodes (e.g., three), distribute the particular number of shards 115 evenly among the three nodes 110*a*-110*c*. At time t0, node 110*a* is storing fifteen shards (115*a*-115*o*) and node 110*b* is also storing fifteen shards (115*p*-115*ad*) for a total of thirty shards 115. The addition of node 110*c* results in a second number of three nodes 110. Since thirty is evenly divisible by three, the distribution plan includes storing ten shards in each of nodes 110*a*-110*c*.

Otherwise, in response to determining that the particular number of shards 115 is not evenly divisible by the second number of nodes, computer system 101 may be configured to divide the particular number of shards 115 into a different number of shards that is larger than the particular number. Computer system 101 may then determine whether the different number of shards is evenly divisible by the second number of nodes. Additional details regarding dividing shards are presented below in regard to FIG. 2.

As shown at time t1, computer system 101 may select a subset of the particular number of shards 115 to move within the second number of nodes 110. Computer system 101 selects five shards each from nodes 110*a* and 110*b*, shards 115*k*-115*o* and shards 115*z*-115*ad*, respectively. Computer system 101 may then move each one of shards 115*k*-115*o* and 115*z*-115*ad* into node 110*c*. In some embodiments, computer system 101 may be configured to move a given shard of shards 115*k*-115*o* and 115*z*-115*ad* (e.g., shard 115*o*) in its entirety by deallocating shard 115*o* from node 110*a* and allocating it to node 110*c* without reading records included in shard 115*o*. For example, shard 115*o* may be encrypted, compressed, and/or archived in such a manner that it may be read as a single unit and copied into node 110*c* without any records in shard 115*o* being read individually from shard 115*o*.

Use of such a technique may enable database sharding management that allows for scale-in and scale-out with reduced computing overhead from more complex sharding management schemes. For example, loads may be balanced between the various nodes, thereby reducing hot spots of access activity centered on a subset of nodes.

It is noted that the embodiment of FIG. 1 is merely an example. Features of the system have been simplified for clarity. In other embodiments, additional elements may be included, such as networking circuits to couple user nodes 110 to computer system 101. In some embodiments, a network interface may be included to enable users to access the database system, including records in the stored shards. Three nodes and 30 shards are used for simplicity. In other embodiments, any suitable number of nodes and shards may be included, as is discussed below in regard to FIG. 5.

In the embodiment of FIG. 1, a number of existing shards was evenly divisible by the increased number of nodes. In some cases, increasing the number of nodes may result in having a number of shards that cannot be evenly distributed across the increased number of nodes. Such an example is presented in FIG. 2.

Figure 2:
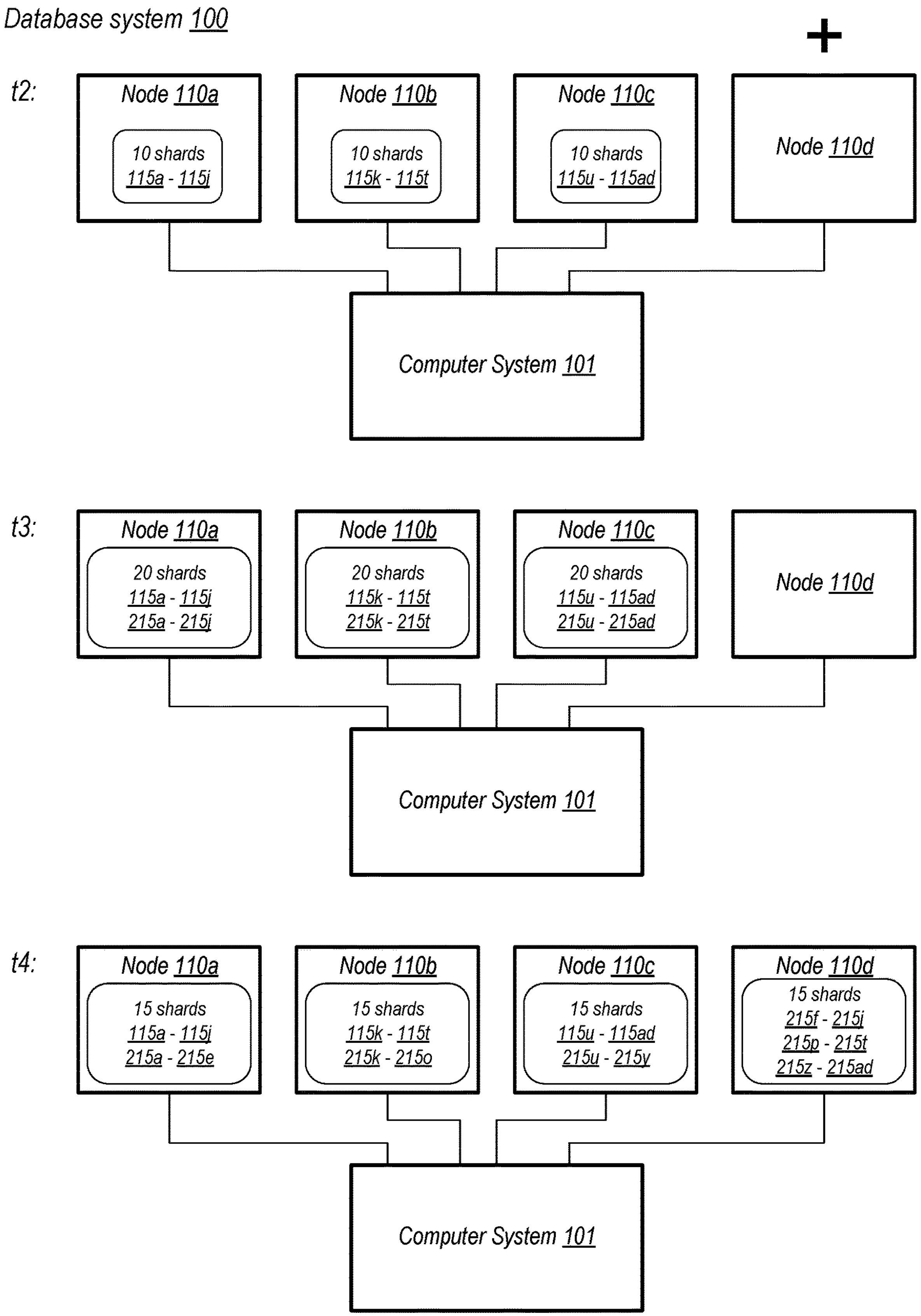
FIG. 2 shows a block diagram of an embodiment of the database system of FIG. 1 at three subsequent points in time.

Proceeding to FIG. 2, the database system of FIG. 1 is depicted at three subsequent points in time. As illustrated, FIG. 2 provides an example of distributing shards across a plurality of nodes when a scale-out operations results in a number of shards not being evenly divisible by the new number of nodes. At time t2, a sharded database is distributed across a first number of nodes (three). Computer system 101 has distributed shards 115*a*-115*ad* to corresponding ones of nodes 110*a*-110*c*. Node 110*d* is added to database system 100 in a scale-out operation. In response to an indication that the number of nodes has changed from the first number (three) to a second number (four), computer system 101 determines a number of shards per node based on the second number of nodes 110.

If computer system 101 determines that the particular number of shards 115 is evenly divisible by the second number of nodes, then computer system 101 may be configured to identify a subset of shards 115 to reallocate across the four nodes 110, and then move a same number of shards of the subset of shards 115 to ones of the second number of nodes 110. For example, if two nodes were added, then equal portions of the subset of shards 115 would be moved to each of the new nodes. Since only one new node is shown in FIG. 2, all shards in the subset would be moved to new node 110*d*.

As shown, however, computer system 101 determines that the particular number of shards (thirty) is not evenly divisible by the second number of nodes (four). To balance the load in response to the determination, computer system 101 may be configured to divide the thirty shards 115 into a different number of shards that is larger than thirty and then identify at least a portion of the newly generated ones of the different number of shards to reallocate. At time t3, computer system 101 divides the thirty shards 115 in half, generating a total of sixty shards: the thirty original shards 115*a*-115*ad* and thirty new shards 215*a*-215*ad* (collectively 215). This dividing may include reading half of the records from each shard into a respective one of the new shards 215. In some embodiments, the generation of new shards may be performed concurrently by each of nodes 110*a*-110*c*, thereby reducing an amount of time used to generate the new shards.

Computer system 101 may be configured to identify a subset of the newly created thirty shards 215*a*-215*ad* to reallocate to added node 110*d*. In a similar manner as described above, computer system 101 may be configured to move, without reading individual records included in moved shards, the subset of shards 215 to node 110*d*. As shown at time t4, five shards 215*f*-215*j* are moved from node 110*a*, five shards 215*p*-215*t* are moved from node 110*b*, and five shards 215*z*-215*ad* are moved from node 110*c*. After the move, each of nodes 110 is storing fifteen shards of the sixty total shards.

By dividing the existing shards into an increased number of shards, the larger number of shards may be divisible by the new number of nodes after the scale-out operation. Furthermore, doubling the number of shards as shown in the example may create a number of shards that is evenly divisible after subsequent scale-out operations further increase the total number of nodes.

It is noted that the embodiment of FIG. 2 is merely an example. As previously described, features of the database system have been simplified for clarity. In other embodiments, additional elements may be included, such as networking circuits to couple computer system 101 to nodes 110, and/or one or more storage devices included in each of nodes 110 for storing the sharded records.

Figure 3:
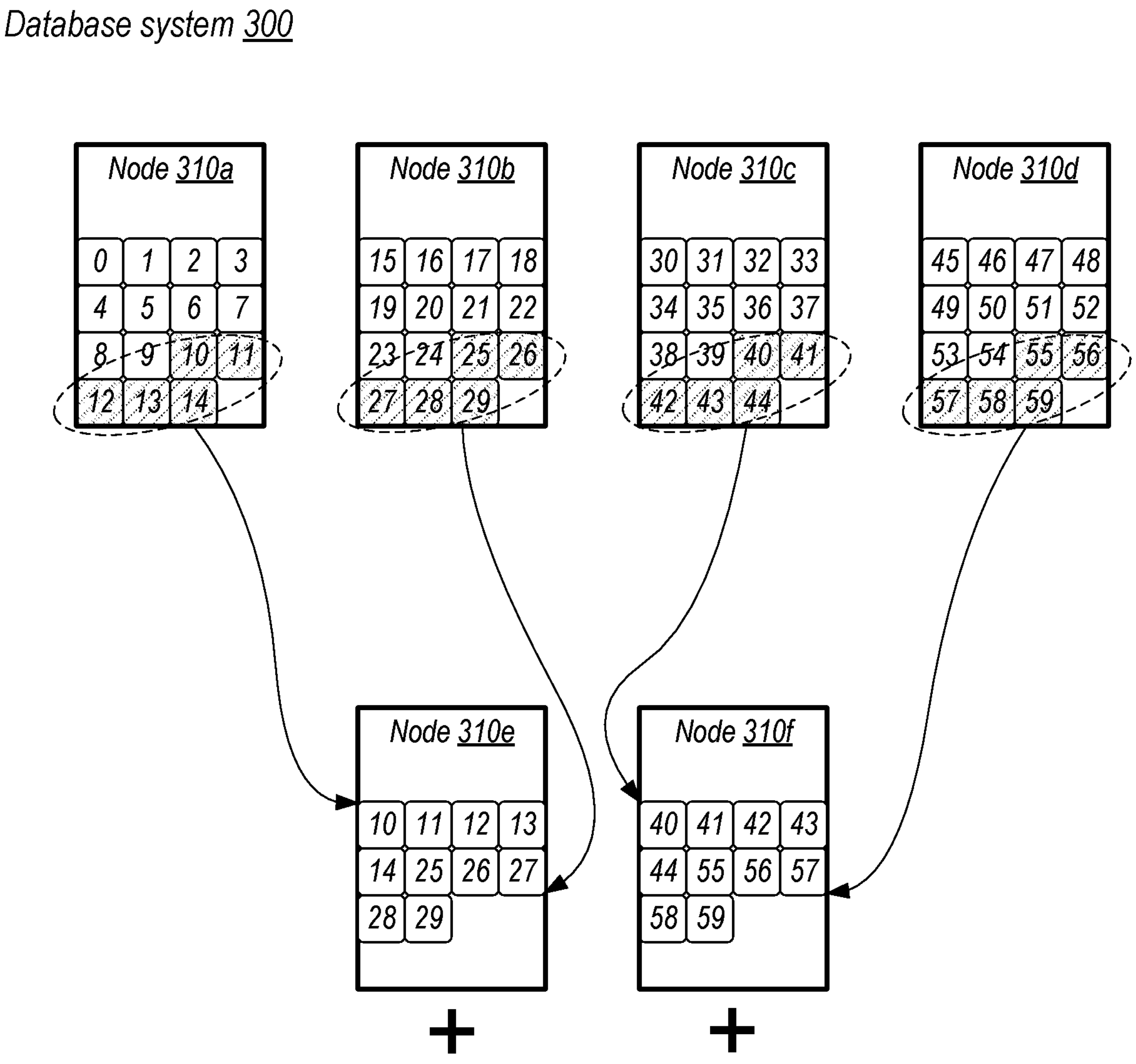
FIG. 3 depicts a block diagram of another embodiment of a database system that may be used to maintain a sharded database.

In FIGS. 1 and 2, a single node is shown to be added in each example. In some cases, multiple nodes may be added in a scale-out operation. Various techniques may be used to distribute shards for load balancing. FIG. 3 illustrates one such example.

Moving to FIG. 3, a block diagram of an embodiment of a database system is shown. Database system 300 is shown with four nodes 310*a*-310*d* storing a plurality of sixty shards numbered 0-59, with each one of nodes 310*a*-310*d* storing fifteen shards apiece. Two nodes, 310*e* and 310*f*, are added to database system 300.

Moving from four nodes to six nodes results in the number of shards per node changing from fifteen each to ten each. Accordingly, twenty shards are selected to redistribute to the two new nodes 310*e* and 310*f*. As shown in FIG. 3, Five shards each from nodes 310*a*-310*d* are selected and moved to either node 310*e* or node 310*f*. Although the last five shards from each node are shown as being selected for reallocation, any suitable strategy for selecting shards for reallocation may be used. For example, the five oldest shards may be selected. In some embodiments, shards may be tracked for how often they are accessed, and shard selection may be based on this frequency of access. Selection of shards may include selecting a mix of shards that are frequently accessed and infrequently accessed, so as to balance a number of future accesses across all six nodes 310.

After selecting twenty of the sixty shards to reallocate, the twenty selected shards are moved in their entirety, without reading individual records within the shards. For example, moving a given shard of the subset of shards in its entirety may be accomplished by deallocating the given shard from a first node of the first number of nodes and allocating it to a second node of the second number of nodes without reading records included in the given shard. Each one of shards 10-14 may be moved from node 310*a* to node 310*e* without accessing individual records included within these shards. In some embodiments, ones of the sixty shards may be physical partitions in a storage device, or each shard may be an individual storage device. In such an embodiment, moving shard 10 from node 310*a* to 310*e* may include deallocating the physical partition of shard 10 from node 310*a* and allocating it to node 310*e*. These physical partitions may be assigned (e.g., by a computer system such as computer system 101 in FIGS. 1 and 2) to a particular virtual machine that is operable as a given one of nodes 310. Reallocating the physical partition for shard 10 may, therefore, include reassigning this physical partition from a virtual machine implementing node 310*a* to a virtual machine implementing node 310*e*.

It is noted that FIG. 3 is one example of moving shards to nodes added in a scale-out operations. Shards are shown as being in groups from a particular source node to a particular destination node. E.g., all shards from node 310*a* are shown to be moved to node 310*e*. In other embodiments, selected shards from a given source node may be moved to different destination nodes, for example, to increase a balance between frequently accessed shards and rarely accessed shards.

Figure 4:
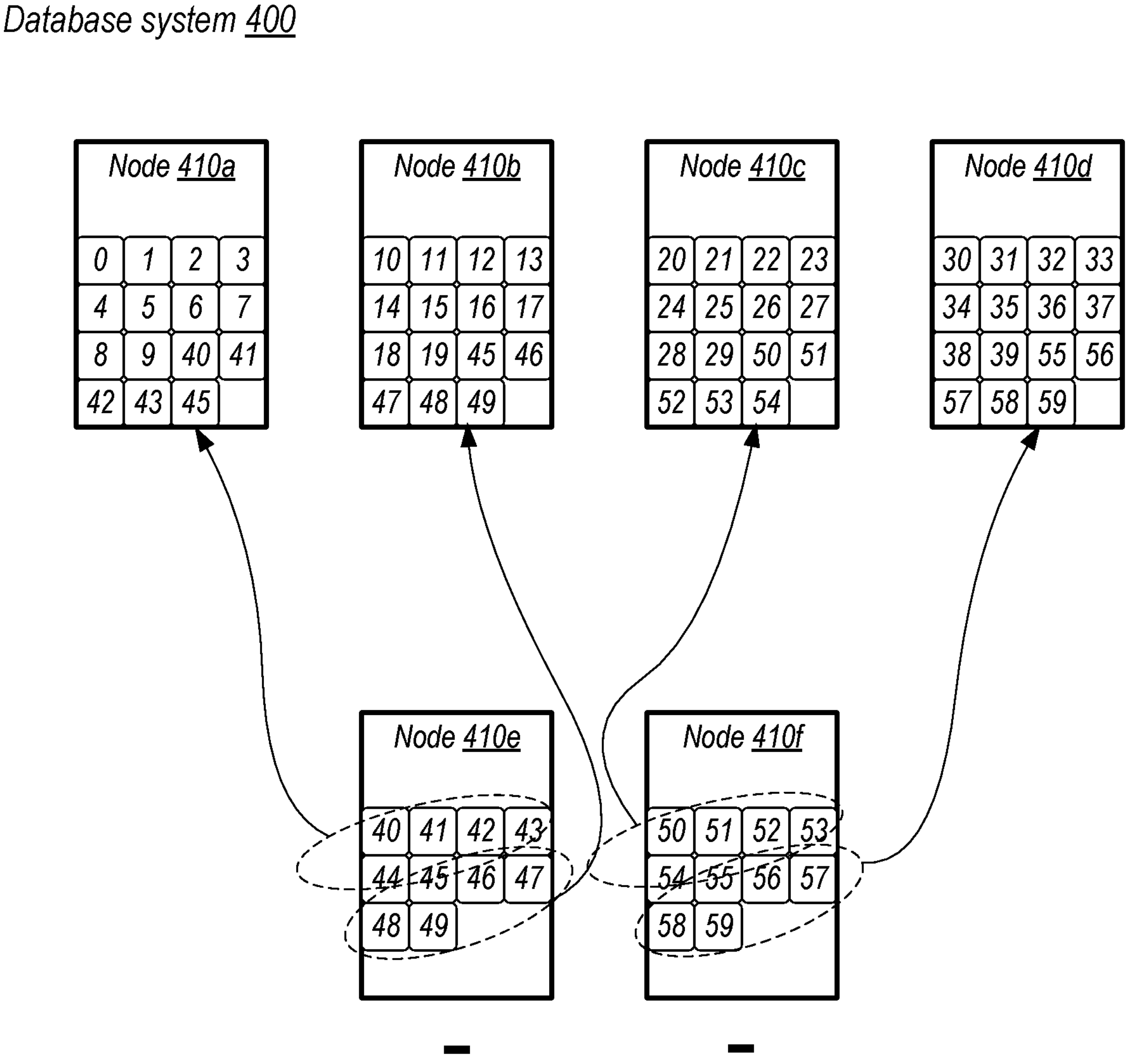
FIG. 4 illustrates a block diagram of a third embodiment of a database system that may be used to maintain a sharded database.

In the embodiments of FIGS. 1-3, scale-out operations are depicted. In some cases, scale-in operations may be performed, resulting in fewer nodes being available for the plurality of shards. FIG. 4 illustrates such an example.

Proceeding to FIG. 4, a block diagram of another embodiment of a database system is illustrated. Database system 400 is shown with six nodes 410*a*-410*f* storing a plurality of sixty shards numbered 0-59, with each one of nodes 410*a*-410*f* storing ten shards apiece. Two nodes, 410*c* and 410*f*, are to be removed from database system 300 in a scale-in operation, leaving database system 400 with four nodes 410.

To perform the scale-in operation, the twenty shards 40-59 stored in nodes 410*e* and 410*f* are reallocated to the four nodes remaining at the completion of the scale-in operation. A determination is made that the twenty shards 40-59 can be evenly divided into the four remaining nodes 410*a*-410*d*. A distribution plan is generated allocating five shards apiece from shards 40-59 to each of nodes 410*a*-410*d*. As described above, moving a given shard of shards 40-59 includes reading the given shard without reading records included in the given shard, and allocating it to a respective node of nodes 410*a*-410*d*. In some embodiments, moving the given shard in its entirety may include reading it as a single data object. For example, the given shard may be archived and/or compressed and, therefore, readable as a single data object.

In various embodiments, nodes 410*e* and 410*f* may be removed temporarily or permanently. For example, nodes 410*e* and 410*f* may be taken offline in response to an indication of a potential problem. The nodes may be tested and returned to active use if the testing passes, or replaced or repaired if testing fails. In other cases, nodes 410*e* and 410*f* may be removed due to a reduction in database activity resulting in excess capacity. Taking nodes 410*e* and 410*f* offline may allow for power and/or costs to be reduced during the period of reduced activity.

It is further noted that the example of FIG. 4 is merely for demonstrative purposes. For clarity, only nodes are illustrated for the database system. Other embodiments may include various other elements, including for example, a computer system, such as computer system 101, to perform some or all of the operations for moving shards between nodes. As previously described, nodes 410 may include one or more storage devices used for storing shards.

FIGS. 1-4 depict various database systems in which a sharded database may be distributed across a plurality of nodes. In the disclosed descriptions, it is stated that it may be desired to maintain an even number of shards across all active nodes in a database system for load balancing. Maintaining a balanced load across all nodes may be accomplished in various manners. Tables associated with a particular database management strategy are shown in FIG. 5.

Moving now to FIG. 5, two tables are presented that are associated with an example of a particular strategy for managing a shared database. A first of the two tables is shard distribution table 501 which includes three columns; an index value 'j,' a number of nodes (n) for a given value of 'j,' and a number of shards (k) for a given value of 'j.' A second of the two tables is shard identification (ID) table 550. Shard ID table 550 includes two columns; a first column indicating a shard ID value prior to an operation to increase a number of shards, and a second column indicating two shard ID values for each shard after it is divided.

As illustrated, shard distribution table 501 depicts a strategy for managing a number of nodes and a number of shards to use in a sharded database system, such as database system 100 in FIG. 1. Shard distribution table 501 may be used to determine a number of nodes to use for a number of shards or vice versa. The index value 'j' represents a whole number that is used to select a given row in the table. For each value of 'j' there are corresponding values for selecting a number of nodes to be used in the database system and defining a number of shards to be distributed across the indicated number of nodes. As depicted, the number of nodes that can be active in the database system at a given point in time is limited to a particular subset of whole numbers. In the illustrated example, the particular subset of whole numbers is based on powers of two. In other embodiments, however, any particular strategy may be used to determine a relationship between a number of nodes and a number of shards. The particular subset of whole numbers in the illustrated example includes a subset of a set of {2^j, 5*2^(j−2), 3*2^(j−1), 15*2^(j−3)}. It is noted that, for values of 'j' that are greater than or equal to two, such an embodiment may limit a maximum increment for in the number of nodes to twenty-five percent for adjacent numbers in the set. When a current number of nodes is sixteen, for example, the next step for increasing the number of nodes is twenty, a twenty-five percent increase from sixteen. For many sharded databases, a scale-out operation requiring a twenty-five percent increase in the number of nodes may be an acceptable cost.

Similarly, the particular number of shards in the illustrated example is determined by the equation 15*2^j. For example, using j=2 results in options of using 4, 5, or 6 nodes to store 60 shards. Implementing a database system using this strategy allows a choice of four nodes with fifteen shards per node, five nodes with twelve shards per node, or six nodes with ten shards per node. In addition, the choice of j=2 allows the database system to scale in and out from four to six nodes without having to change the number of shards.

If, however, a database system currently has six nodes and there is a desire to scale out, then shard distribution table 501 is used to determine the options for the number of allowable nodes. Scaling out when six nodes are currently active in the database system results in increasing the value of 'j.' Four options for the number of nodes are available when j=3, including 8, 10, 12, or 15 nodes. In addition, the number of shards is doubled to 120. The database system may be further scaled out using even larger values of 'j.' It is noted that for each value of 'j' when j>2, there are four options for the number of nodes that enable an even distribution of the indicated number of shards. As previously disclosed, each shard can be moved in its entirety to another node without reading individual records within the shard, thereby reducing an amount of time and resources used to redistribute shards. Scale-in operations may similarly use shard distribution table 501 to identify allowable choices for the number of nodes and the corresponding number of shards to use.

When a scale-out operation results in moving to a next row of shard distribution table 501, the number of shards doubles. New shard ID values are generated for each of the newly generated shards. Shard ID table 550 illustrates such an operation when starting from thirty shards and expanding to sixty shards. The database system, e.g., computer system 101, generates, based on the new number of shards, a shard ID for the newly generated ones of the new number of shards. Each shard ID should be used only once for a given sharded database. In the present example, shard IDs range from 0-29 for the thirty pre-split shards. To generate the sixty post-spit shards, each shard is divided into two shards with a first shard maintaining the original shard ID and a second shard receiving a shard ID value equal to the first shard ID plus the number of pre-split shards, or thirty in the present example. As shown, pre-split shard ID '0' is split into shard ID '0' and shard ID '30,' pre-split shard ID '1' is split into shard ID '1' and shard ID '31,' and so forth.

Figure 6:
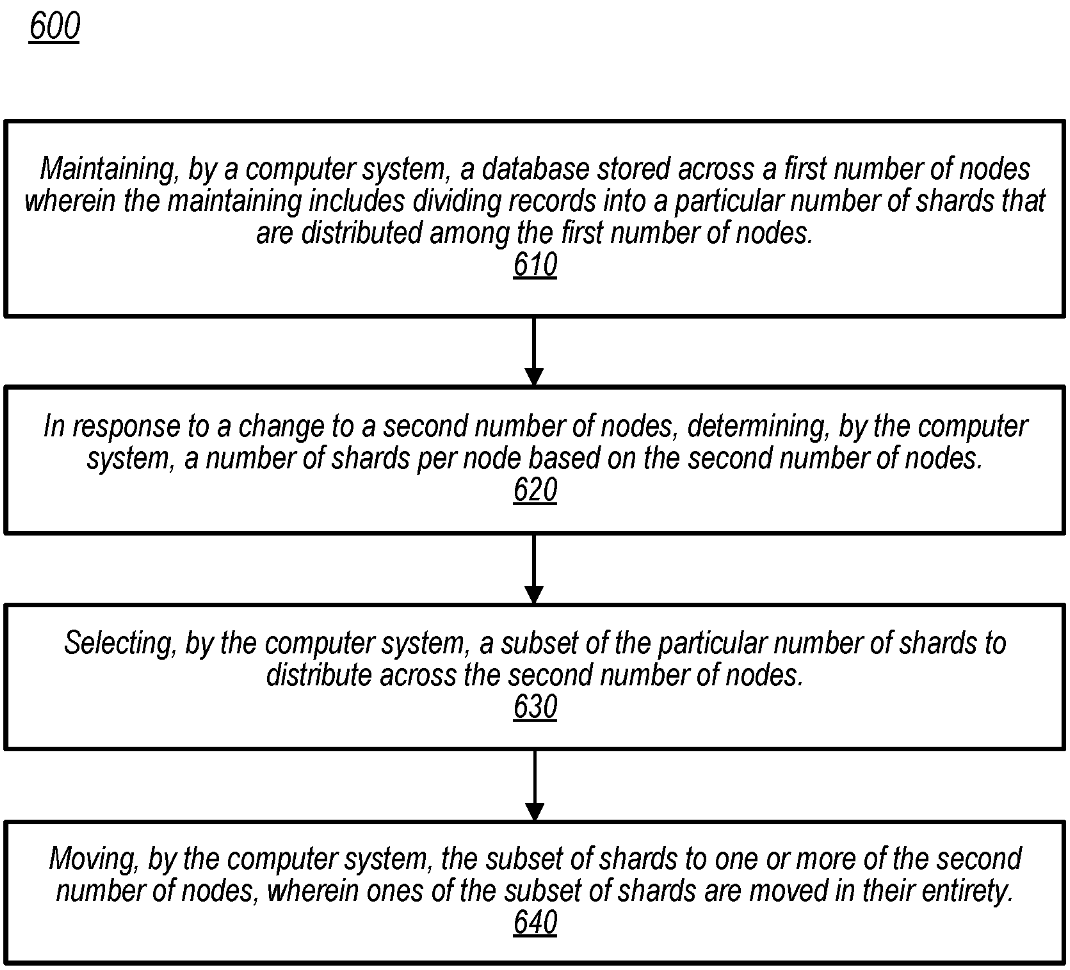
FIG. 6 depicts a flow diagram of an embodiment of a method for managing, by a database system, a sharded database.
Figure 7:
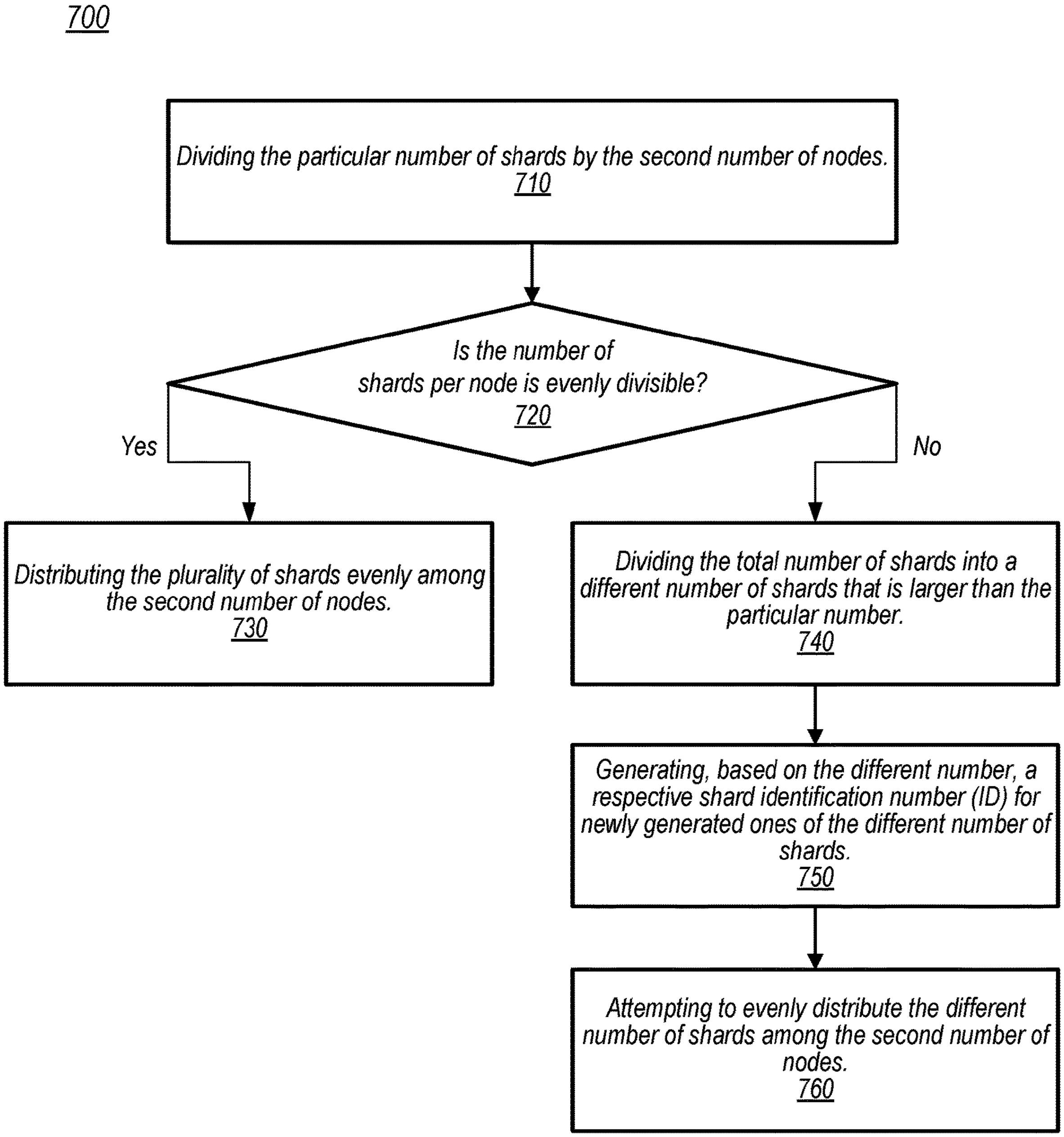
FIG. 7 illustrates a flow diagram of an embodiment of a method for distributing shards cross a plurality of nodes in a sharded database.

It is noted that the tables of FIG. 5 merely illustrate one strategy for managing a sharded database capable of supporting scale-out and scale-in operations. Variations of the depicted tables, including use of different algorithms, are contemplated for other embodiments. As presented above, FIGS. 1-5 describe systems and strategies for managing a sharded database. Techniques described in regard to these figures may be implemented using a variety of methods. FIGS. 6 and 7 depict two such methods.

Proceeding now to FIG. 6, a flow diagram of an embodiment of a method for maintaining a sharded database that is distributed across a plurality of storage nodes is depicted. In various embodiments, method 600 may be performed by a computer system such as computer system 101 in FIGS. 1 and 2. Using FIG. 1 as an example, computer system 101 may include (or have access to) a non-transitory, computer-readable medium having program instructions stored thereon that are executable by the computer system to cause the operations described with reference to FIG. 6. Method 600 is described below using database system 100 of FIG. 1 as an example. References to elements in FIG. 1 are included as non-limiting examples.

At block 610, method 600 begins with a computer system maintaining a database stored across a first number of nodes, wherein the maintaining includes dividing records into a particular number of shards that are distributed among the first number of nodes. For example, database system 100 includes two nodes 110*a* and 110*b* that are used to store a plurality of records. Nodes 110*a* and 110*b* may be coupled to a respective one or more data stores and configured to manage access to a database that includes shards 115, distributed across nodes 110*a* and 110*b*. Computer system 101 may be configured to maintain database system 100 across nodes 110*a* and 110*b*, including dividing the records for storage across shards 115. In some embodiments, shards 115 may be physical partitions, including for example, individual storage devices coupled to a computing device that performs the operations associated with a given node of nodes 110*a* and 110*b*. In various embodiments, these computing devices may be respective computers, virtual machines implemented within a database server, and the like.

Method 600 continues at block 620 with the computer system, in response to a change to a second number of nodes, determining a number of shards per node based on the second number of nodes. As shown in FIG. 1, for example, node 110*c* may be added to nodes 110*a* and 110*b*, resulting in a change from two nodes 110*a* and 110*b* to three nodes 110*a*, 110*b*, and 110*c*. Computer system 101, in response to this change, may be configured to determine how to distribute shards 115 across the three nodes 110*a*-110*c*. To determine the number of shards per node, computer system 101 may divide the total number of shards 115 currently distributed across nodes 110*a* and 110*b* by the new number of nodes, e.g., three.

Method 600 further continues to block 630 with the computer system selecting a subset of the particular number of shards to distribute across the second number of nodes. As shown at time t1, computer system 101 may be configured to select a subset of shards 115 to move to node 110*c*, such that each of nodes 110 stores a same number of shards 115. In the present example, computer system 101 selects the subset of shards as five shards each from nodes 110*a* and 110*b*, e.g., shards 115*k*-115*o* and shards 115*z*-115*ad*.

At block 640, method 600 proceeds with the computer system moving the subset of shards to one or more of the second number of nodes, wherein ones of the subset of shards are moved in their entirety. Computer system 101 may then move, in their entirety, each one of shards 115*k*-115*o* and 115*z*-115*ad* into node 110*c*. To move a given shard (e.g., shard 115*k*) in its entirety, computer system 101 may be configured to deallocate shard 115*k* from node 110*a* and allocate it to node 110*c* without reading records included in shard 115*k*. For example, shard 115*k* may be encrypted, compressed, and/or archived in such a manner that it may be read as a single unit and copied into node 110*c* without any records in shard 1150 being read individually from shard 115*o*. In other embodiments, shard 115*k* may be a physical partition that can be reassigned to various ones of nodes 110.

It is noted that the method of FIG. 6 includes blocks 610-640. Method 600 may end in block 640 or may repeat some or all of blocks 610-640. For example, blocks 620-640 may be repeated after another change in the number of nodes is detected. In some cases, method 600 may be performed concurrently with other instantiations of the method. For example, two or more processors in computer system 101 may each perform a respective instance of method 600, for example, managing separate sharded databases included within the database system.

Moving to FIG. 7, a flow diagram of an embodiment of a method for determining a shard distribution plan by a computer system is depicted. In a similar manner to method 600, method 700 may be performed by a computer system such as computer system 101 in FIGS. 1 and 2. The computer system may, for example, include (or have access to) a non-transitory, computer-readable medium having program instructions stored thereon that are executable by the computing device to cause at least some of the operations described with reference to FIG. 7. In some embodiments, portions or all of method 700 may correspond to one or more actions that occur as a part of blocks 620 to 640 in method 600. Method 700 is described below using database system 100 in FIGS. 1 and 2 as examples. References to elements in FIGS. 1 and 2 are included as non-limiting examples. Operations of method 700 may begin in block 620 of method 600, e.g., after computer system 101 has detected a change in the number of nodes 110 in database system 100, from three to four, as shown in FIG. 2.

At block 710, method 700 begins with the computer system dividing the particular number of shards by the second number of nodes. As has been described above, computer system 101, in response to detecting the change in the number of nodes 110, may determine a number of shards per node by dividing the total number of shards 115 currently distributed across nodes 110*a*-110*c* by the new number of nodes, e.g., four.

Further operation of method 700 may depend, at block 720, on a total number of shards being evenly divisible by the second number of nodes. To maintain load balance across all active nodes 110, it may be desired to have the same number of shards stored on each of the active nodes 110. Accordingly, the number of shards per node should be a whole number.

In response to the number of shards being evenly divisible, method 700 proceeds to block 730 with the computer system distributing the particular number of shards evenly among the second number of nodes. If the number of shards per node is even across the four nodes 110*a*-110*d*, then computer system 101 may select a same number of shards from each of nodes 110*a*-110*c*, and move these selected shards to node 110*d*, e.g., using any of the techniques disclosed above.

In response to the number of shards not being evenly divisible, method 700 continues instead at block 740 with the computer system dividing the particular number of shards into a different number of shards that is larger than the particular number. If, on the other hand, the number of shards does not evenly distribute across the four nodes 110*a*-110*d*, then computer system 101 may divide each of shards 115 into a larger number of smaller shards. In the example of FIG. 2, the thirty original shards 115*a*-115*ad* are doubled into sixty shards, 115*a*-115*ad* and 215*a*-215*ad*. In such an operation, records stored in a pre-split shard may be distributed equally between the two post-split shards.

Method 700 continues at block 750 with the computer system generating, based on the different number, a respective shard identification number (ID) for newly generated ones of the different number of shards. In a sharded database, each shard may be tracked using a respective shard ID. Accordingly, the increase in the number of shards results in new shards needing respective shard IDs. Shard IDs may be assigned using any suitable technique. For example, post-split shards 115*a*-115*ad* may be assigned the same shard IDs as the respective pre-split shards 115*a*-115*ad*. Post-split shards 215*a*-215*ad* may be assigned new shard IDs using, for example, shard ID table 550 in FIG. 5. In other embodiments, all post-split shards may receive new shard IDs to differentiate from the pre-split shards.

At block 760, method 700 further continues with the computer system attempting to evenly distribute the different number of shards among the second number of nodes. For example, computer system 101 may be configured to identify a subset of the sixty post-split shards to move into added node 110*d*. After identifying the subset, computer system 101 may move the subset of shards to node 110*d* without reading individual records included in moved shards. As shown in FIG. 2, shards 215*f*-215*j*, 215*p*-215*t*, and 215*z*-215*ad* are moved from nodes 110*a*-110*c* to node 110*d*. After the move, each of nodes 110 is storing fifteen shards of the sixty total shards. To move the subset of shards without reading individual records included in moved shards, computer system 101 may be configured to utilize any of the techniques disclosed herein.

It is noted that the method of FIG. 7 includes blocks 710-760. Method 700 may end in block 730 or 760. In some cases, some, or all, of the operations may be repeated in response to a subsequent detection of another change in the number of nodes. In a similar manner to method 600, different instances of method 700 may be performed by one or more processors to manage different sharded databases within database system 100. Method 700 may be performed concurrently with (or as a part of) method 600.

Figure 8:
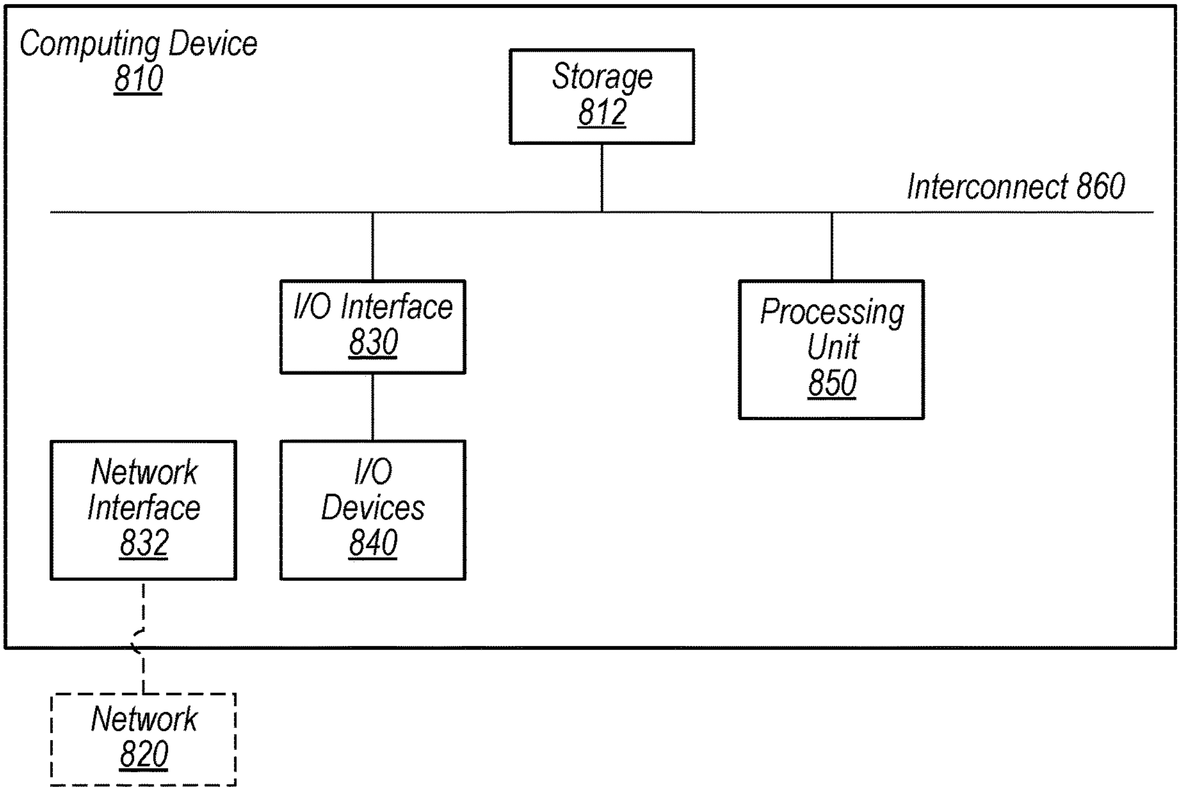
FIG. 8 is a block diagram illustrating an example computer system, according to some embodiments.

In the descriptions of FIGS. 1-7, various computer systems and online services have been disclosed. Such systems may be implemented in a variety of manners. FIG. 8 provides an example of a computer system that may correspond to one or more of the disclosed systems.

EXAMPLE COMPUTING DEVICE

Turning now to FIG. 8, a block diagram of one embodiment of computing device (which may also be referred to as a computer system) 810 is depicted. Computing device 810 may be used to implement various portions of this disclosure. Computing device 810 may be any suitable type of device, including, but not limited to, a personal computer system, desktop computer, laptop or notebook computer, mainframe computer system, web server, workstation, or network computer. As shown, computing device 810 includes processing unit 850, storage subsystem (storage) 812, and input/output (I/O) interface 830 coupled via an interconnect 860 (e.g., a system bus). I/O interface 830 may be coupled to one or more I/O devices 840. Computing device 810 further includes network interface 832, which may be coupled to network 820 for communications with, for example, other computing devices.

In various embodiments, processing unit 850 includes one or more processors. In some embodiments, processing unit 850 includes one or more coprocessor units. In some embodiments, multiple instances of processing unit 850 may be coupled to interconnect 860. Processing unit 850 (or each processor within 850) may contain a cache or other form of on-board memory. In some embodiments, processing unit 850 may be implemented as a general-purpose processing unit, and in other embodiments it may be implemented as a special purpose processing unit (e.g., an ASIC). In general, computing device 810 is not limited to any particular type of processing unit or processor subsystem.

Storage subsystem 812 is usable by processing unit 850 (e.g., to store instructions executable by and data used by processing unit 850). Storage subsystem 812 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 812 may consist solely of volatile memory, in one embodiment. Storage subsystem 812 may store program instructions executable by computing device 810 using processing unit 850, including program instructions executable to cause computing device 810 to implement the various techniques disclosed herein.

I/O interface 830 may represent one or more interfaces and may be any of various types of interfaces configured to couple to and communicate with other devices, according to various embodiments. In one embodiment, I/O interface 830 is a bridge chip from a front-side to one or more back-side buses. I/O interface 830 may be coupled to one or more I/O devices 840 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . W, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different elements (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to"

perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

In this disclosure, various "modules" operable to perform designated functions may be shown in the figures and described in detail. As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A method comprising:

maintaining, by a computer system, a database stored across a first number of storage nodes, wherein the maintaining includes dividing records into a particular number of shards that are distributed among the first number of storage nodes, wherein the first number of storage nodes is determined using a first formula of a plurality of formulas, and wherein the plurality of formulas use an index value that is based on a total number of shards that can be stored in the first number of storage nodes;

in response to a change from the particular number of shards to a different number of shards, determining, by the computer system, a second number of storage nodes for storing the different number of shards, wherein the second number of storage nodes is determined using a second formula of the plurality of formulas, different than the first formula;

selecting, by the computer system, a subset of the different number of shards to distribute across the second number of storage nodes, wherein the selecting includes identifying the subset of the different number of shards as a group of shards stored on a common set of one or more physical storage partitions; and moving, by the computer system, the subset of the different number of shards to one or more of the second number of storage nodes, wherein moving the subset of the different number of shards includes deallocating the common set of one or more physical storage partitions from ones of the first number of storage nodes and reallocating the common set of one or more physical storage partitions to ones of the second number of storage nodes.

2. The method of claim 1, wherein determining a number of shards per storage node includes:

dividing the different number of shards by the second number of storage nodes; and in response to determining that the number of shards per storage node is evenly divisible, distributing the different number of shards evenly among the second number of storage nodes.

3. The method of claim 1, wherein determining a number of shards per storage node includes:

dividing the different number of shards by the second number of storage nodes; and in response to determining that the number of shards per storage node is not evenly divisible:

dividing the different number of shards into a given number of shards that is larger than the different number; and attempting to evenly distribute the given number of shards among the second number of storage nodes.

4. The method of claim 3, further comprising generating, based on the given number, a respective shard identification number (ID) for newly generated ones of the given number of shards.

5. The method of claim 1, wherein ones of the subset of shards are moved in their entirety.

6. The method of claim 1, wherein at least a portion of the second number of storage nodes are virtual machines that are operable as respective ones of the second number of storage nodes.

7. The method of claim 1, wherein the second number of storage nodes is less than the first number of storage nodes.

8. The method of claim 1, wherein the first and second formulas limit the first and second numbers of storage nodes to respective subsets of whole numbers.

9. The method of claim 8, further comprising limiting the number of shards to a different subset of whole numbers wherein:

for a first number of shards, the first and second numbers of storage nodes are limited to a first subset of whole numbers; and for a second number of shards, the first and second numbers of storage nodes are limited to a second subset of whole numbers, wherein the second subset does not overlap the first subset.

10. A system comprising:

a first number of one or more nodes that are coupled to a respective one or more data stores and configured to manage access to a database including a particular number of shards that are stored across the first number of nodes, wherein the first number of nodes is determined using a first scaling approach that utilizes a first formula of a plurality of formulas, and wherein the plurality of formulas use an index value that is based on a maximum number of shards that can be stored in the first number of nodes;

a non-transitory computer-readable memory storing instructions; and a processor configured to execute the instructions to cause the system to perform operations comprising:

after a change from the first number of nodes to a second number of nodes, determining a distribution plan to distribute the particular number of shards across the second number of nodes, wherein the second number of nodes is determined using a second formula of the plurality of formulas, different than the first formula;

selecting a subset of the particular number of shards to move within the second number of nodes, wherein the selecting includes identifying the subset of the particular number of shards as a group of shards stored on a common set of one or more physical storage partitions; and moving ones of the subset of the particular number of shards to a different one of the second number of nodes, wherein moving the subset of the particular number of shards includes deallocating the common set of one or more physical storage partitions from ones of the first number of nodes and reallocating the common set of one or more physical storage partitions to ones of the second number of nodes.

11. The system of claim 10, wherein the operations further include determining the distribution plan by:

in response to determining that the particular number of shards is evenly divisible by the second number of nodes, distributing the particular number of shards evenly among the second number of nodes.

12. The system of claim 10, wherein the operations further include determining the distribution plan by:

in response to determining that the particular number of shards is not evenly divisible by the second number of nodes:

dividing the particular number of shards into a different number of shards that is larger than the particular number; and determining whether the different number of shards is evenly divisible by the second number of nodes.

13. The system of claim 12, wherein the operations further include generating, based on the different number, a shard identification number (ID) for newly generated ones of the different number of shards.

14. The system of claim 10, wherein the operations further include moving a given shard of the subset of shards in its entirety by deallocating the given shard from a first node of the first number of nodes and allocating it to a second node of the second number of nodes without reading records included in the given shard.

15. The system of claim 10, wherein the first and second numbers of nodes are limited to a particular subset of whole numbers that are based on powers of two.

16. A non-transitory, computer-readable medium including instructions that when executed by a computer system, cause the computer system to perform operations including:

distributing a sharded database across a first number of storage nodes, including assigning ones of a particular number of shards to corresponding storage nodes, wherein the first number of storage nodes is determined using a first equation of a plurality of equations, and wherein the plurality of equations use an index value that is based on a total number of shards in the sharded database;

in response to an indication that a number of storage nodes has changed from the first number of storage nodes to a second number of storage nodes, determining a number of shards per storage node based on the second number of storage nodes, wherein the second number of storage nodes is determined from a second equation of the plurality of equations, and wherein ones of the equations produce whole numbers that do not intersect with other ones of the plurality of equations;

identifying a subset of the particular number of shards to reallocate across the second number of storage nodes, wherein the identifying includes identifying the subset of the particular number of shards as a group of shards stored on a common set of one or more physical storage partitions; and moving the subset of the particular number of shards to particular ones of the second number of storage nodes, wherein moving the subset of the particular number of shards includes deallocating the common set of one or more physical storage partitions from ones of the first number of storage nodes and reallocating the common set of one or more physical storage partitions to ones of the second number of storage nodes.

17. The computer-readable medium of claim 16, wherein the operations further include moving the subset of shards by:

in response to determining that the particular number of shards is evenly divisible by the second number of storage nodes, moving a same number of shards of the subset of shards to ones of the second number of storage nodes.

18. The computer-readable medium of claim 16, wherein the operations further include moving the subset of shards by:

in response to determining that the particular number of shards is not evenly divisible by the second number of storage nodes:

dividing the particular number of shards into a different number of shards that is larger than the particular number; and identifying at least a portion of new shards of the different number of shards to reallocate.

19. The computer-readable medium of claim 16, wherein the operations further include moving a given shard of the subset of shards in its entirety by:

reading the given shard without reading records included in the given shard; and allocating it to a second storage node of the second number of storage nodes.

20. The computer-readable medium of claim 16, wherein the second number of storage nodes is less than the first number of storage nodes.

* * * * *